Figure 4:
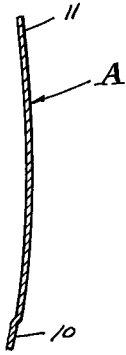

March 15, 1966 F. P. ELLZEY 3,240,445
VENTILATED AIRCRAFT ELEMENTS
Filed March 1, 1962 3 Sheets-Sheet 1
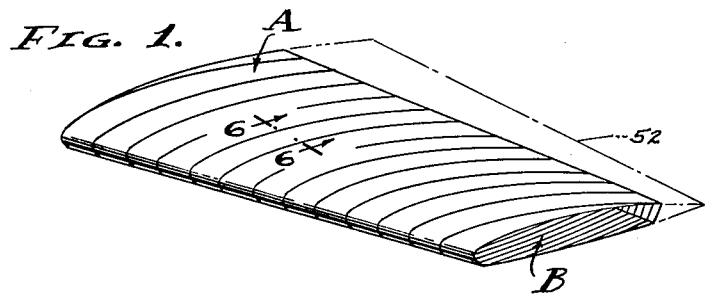
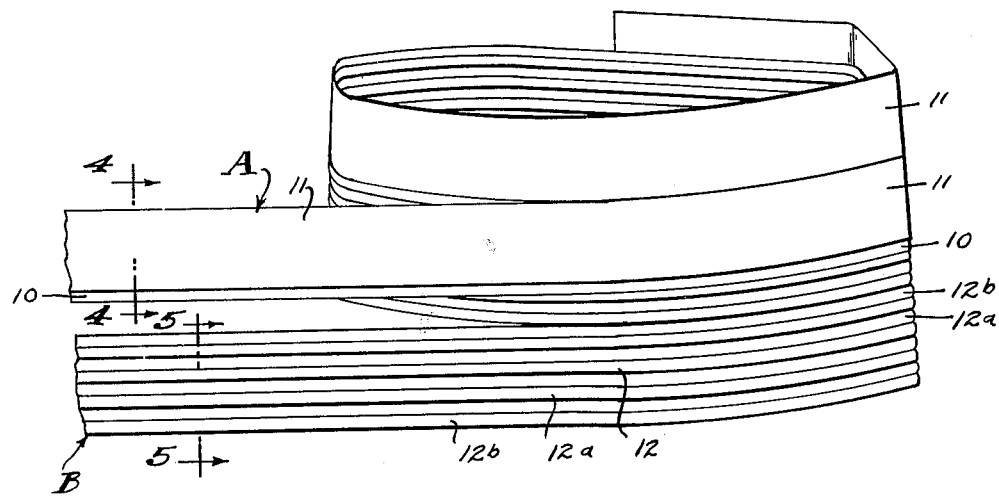
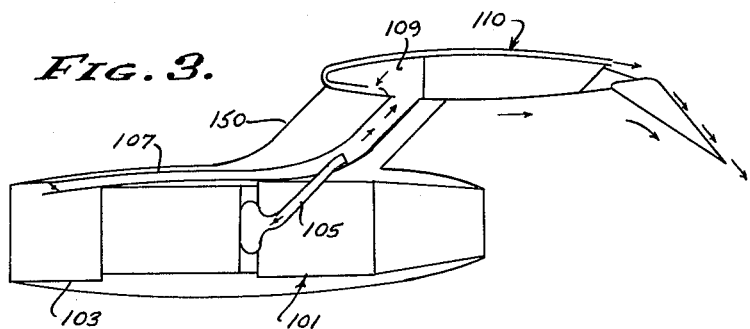
INVENTOR.
FLOYD P. ELLZEY
BY
W. H. Maxwell
AGENT March 15, 1966  F. P. ELLZEY  3,240,445
VENTILATED AIRCRAFT ELEMENTS
Filed March 1, 1962  3 Sheets-Sheet 2

INVENTOR.
FLOYD P. ELLZEY
BY W. H. Maxwell
AGENT

March 15, 1966     F. P. ELLZEY     3,240,445
VENTILATED AIRCRAFT ELEMENTS
Filed March 1, 1962     3 Sheets-Sheet 3
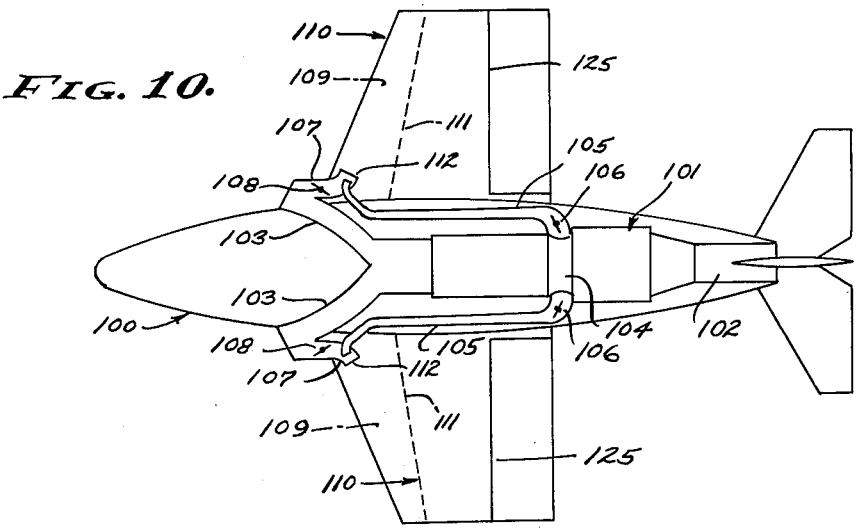
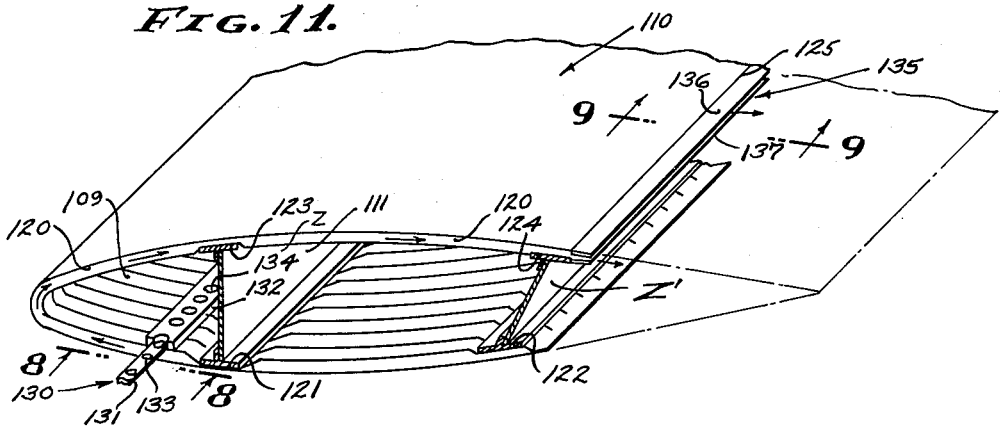
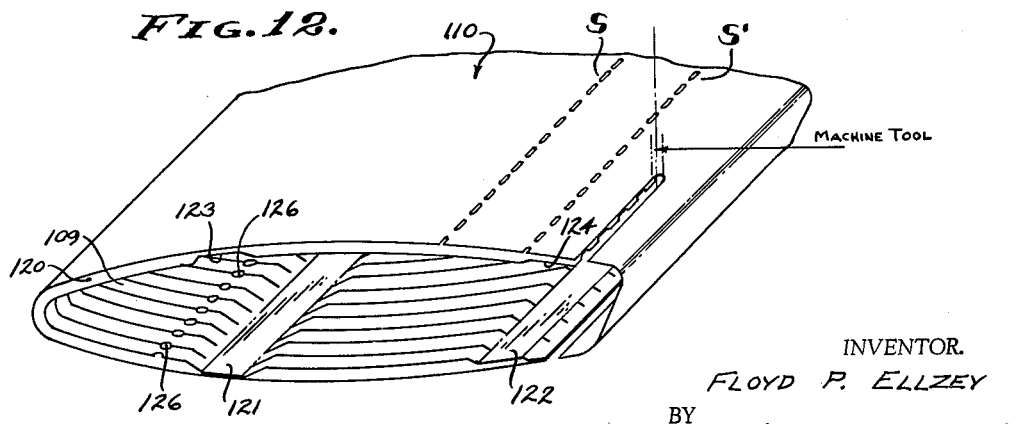
INVENTOR.
FLOYD P. ELLZEY
BY Wm. H. Maxwell
AGENT United States Patent Office 3,240,445
Patented Mar. 15, 1966

3,240,445
VENTILATED AIRCRAFT ELEMENTS
Floyd P. Ellzey, 2301 Marshallfield Lane,
Redondo Beach, Calif.
Filed Mar. 1, 1962, Ser. No. 176,668
8 Claims. (Cl. 244—42)

This application is filed as a continuation in part of my application entitled "Body Construction," filed March 18, 1957, Serial No. 646,756, now Patent 3,023,860 granted March 6, 1962.

This invention relates to aircraft, particularly of the airplane type, and those utilizing the wing principle, and it particularly relates to the structure of air foil elements that are adapted to ventilate air for "Boundary-Layer Control" and the like, it being a general object of my invention to provide a simple, practical, inexpensive construction of sheet metal or the like for use, for example, in the building of the fuselage, the wings, the stabilizers, and the control surfaces such as rudders, elevators, ailerons, and flaps, etc.

My present invention is concerned primarily with an article in the form of fabricated structure and in accordance with the broader principles of my invention I may employ said fabricated structure to make or build any body or hollow shell-like structure, for example the aircraft fuselage, and the wings and related flight elements. In general I may fabricate the structure of any suitable sheet material. However, my invention is particularly suited for fabrication of sheet metal such, for example, as sheet aluminum alloys and the like.

Further, in accordance with my invention I may form structures of various sizes, shapes and characters, for instance, I may provide round, cylindrical structures such as the fuselage of an airplane, or I may form flattened or elliptical structures suitable for wing sections and control surfaces of airplanes. I do not wish the invention limited in any way to the specific formation of airplane parts illustrated in the drawings, these being typical aircraft structures fabricated in accordance with my invention.

It is a general object of my present invention to provide simple, practical aircraft elements of sheet material, preferably sheet metal, fabricated into a practical permanent strong construction characterized in its finished form by inner and outer sheets with ventilating ducts therebetween, the inner sheet being a reinforcing or stiffening element while the outer sheet forms a smooth exterior element.

It is another object of my present invention to provide a structure of the character described capable of being made of continuous lengths or strips or sheet material and to form a single integral ventilated aircraft element thereof.

A further object of my present invention is to provide a ventilated aircraft element of the character above referred to that is essentially mono-coque, or of shell-like character. The elements that I provide are single unit shells in the form of bodies that are fabricated of two elements, one an inner reinforcing element and the other an outer surfacing element.

It is also an object of my invention to provide a body structure of the character referred to that involves a reinforcing or stiffening element that is particularly adapted to conduct fluids to be used in aircraft for "boundary-layer control," or "circulation control," or "anti-icing control," or "structural temperature control," etc. The structure that I provide is readily adapted to conduct the flow of fluids in a variety of manners.

Figure 5:
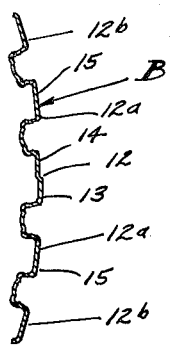
Figure 6:
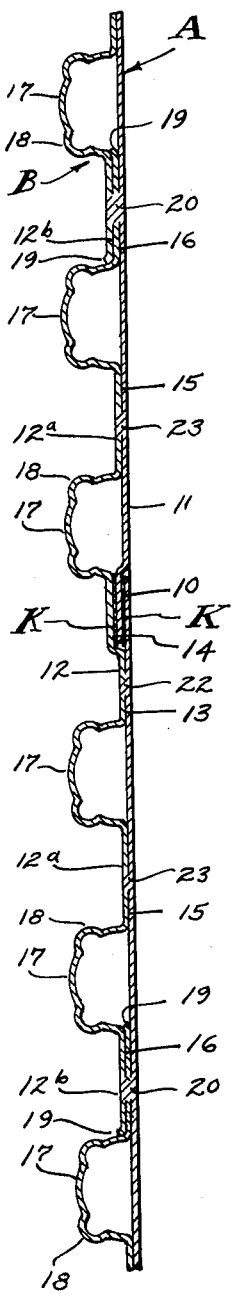
Figure 7:
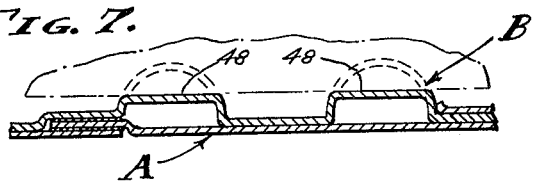
Figure 8:
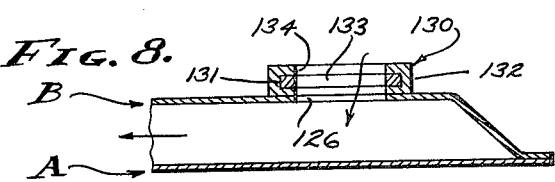
Figure 9:
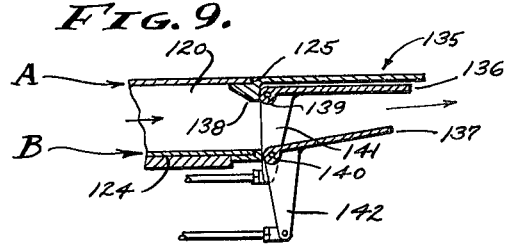

The various objects and features of my invention will be fully understood from the following detailed description of typical preferred forms and applications of my invention, throughout which description reference is made to the accompanying drawings, in which:

FIG. 1 is a perspective view of an aircraft element in the form of a wing section and embodying the structure of the present invention; FIG. 2 is a perspective view illustrating the manner in which the structure is formed, being a view showing the formation of an elongate tubular tapered structure from two continuous strips of sheet material, which structure when finished has a corrugated inner sheet and a plain smooth outer sheet; FIG. 3 is a view of a portion of an aircraft embodying the features of the present invention; FIGS. 4 and 5 are enlarged detailed sectional views taken as indicated by line 4—4 and 5—5 on FIG. 2; FIG. 6 is an enlarged detailed sectional view of a portion of the structure and taken as indicated by line 6—6 on FIG. 1; FIG. 7 is an enlarged sectional view illustrating the manner in which the corrugations are flattened; FIGS. 8 and 9 are enlarged sectional views taken substantially as indicated by line 8—8 and 9—9 on FIG. 11; FIG. 10 is a general plan view of an aircraft illustrating the utility of the present invention; FIG. 11 is a perspective view of a portion of said aircraft and illustrating the ventilation of the wing thereof; and FIG. 12 is a view similar to FIG. 11 and shows the manner in which the wing is machined to form the ventilation openings for discharge over the controlling surface element.

In accordance with the broader principles of my invention I handle a plurality of sheets of material which I will refer to as sheet metal, although I do not wish to be understood as thereby limited. I prefer, in carrying out my invention, to simultaneously handle or work upon two bodies of metal although the broader principles of the invention contemplate that any suitable number of parts or pieces of metal can be worked upon as circumstances require. In the following description I will refer to a form of my invention wherein I work upon two pieces or bodies of sheet metal and I will, for example, refer to these pieces of metal as elongate strips or ribbons of metal. The said strips or ribbons of metal are designated in the drawings as A and B. In general, I wrap the sheets or strips of metal A and B into an elongate tubular structure with one sheet forming the lining of the structure while the other sheet forms the exterior or skin of the structure. In the case illustrated the sheet A forms the skin of the structure while the sheet B forms the lining of the structure. I prefer to shape one of the strips so that it acts both as a stiffening or reinforcing element, and as a ventilating element, and ordinarily I prefer to locate this stiffening or reinforcing element inside of the other element or, in other words, I prefer to make the lining B the stiffening or reinforcing element.

In carrying out my invention I not only wrap the strips of sheet metal into an elongate tubular structure but I prefer to stagger or offset the wrapping of the two strips to stagger or offset the joints or seams that occur at adjacent parts of the strips. I preferably wrap each strip so that it is generally spiralled or helical in form, and I relate the turns or convolutions so that the edge portions of each strip adjoin, in fact, preferably overlap slightly as I have shown throughout the drawings.

Referring to the drawings, I contemplate fixing the adjoining or overlapping parts of each strip together by establishing a seam or joint so that each strip, in and of itself, is in the nature of a complete rigid or permanently formed spiralled structure of the desired cross sectional configuration (see FIG. 5.) Further, in carrying out my invention I prefer to stagger or longitudinally offset the joints of the two sheets so that they do not coincide but rather occur at different points lengthwise of the structure, to the end that there is no point in the structure where a joint is formed from the inside to the outside thereof. Furthermore, it is preferred that where the edges of each strip are joined, that is, along the seam of each strip, the said joint or seam is secured or joined to the overlying or adjoining portion of another strip, to the end that the two strips are joined together along the seams of the strips, with the result that the assembled structure is a permanent integral and, in effect, continuous structure.

Further, in accordance with my invention I preferably wrap the strips into tubular form and to assure tight fitting or adjoining of the overlapping parts of the strips I may initially crown each strip, as shown in FIGS. 4 and 5 of the drawings, so that as the strips are wrapped into tubular form the slight crown established in them is flattened somewhat to the end that the edges have a tendency to bear in or toward the center of the structure establishing tight bearing engagement at that point. It is to be understood that said crowning is not always necessary and may be employed only when circumstances require. Furthermore, where I form one strip such as the strip B as a stiffening and ventilating element in the finished structure, I preferably corrugate it throughout its width and lengthwise so that it is continuously corrugated as will appear from an examination of the drawings.

Referring to the form of the invention illustrated in FIGS. 6 and 7 of the drawings, I contemplate leaving the adjoining or overlapping parts of the strip A unfastened and in the nature of a slip joint, to the end that the completed structure is not rigid or permanently formed but is expansible and flexible and suited to construction of wings and the like. It will be readily understood how this modified form of invention can be used in the formation of wing sections, and that the outer skin or element thereof will not buckle or wrinkle.

Referring more specifically to the sheet A that I have shown in the drawings and which I provide to establish the skin of the finished structure, I prefer to start with a flat sheet that is first bent into the crowned form such as is indicated in FIG. 4 of the drawings, it being understood that in practice a very slight amount of crowning is all that is necessary. Next, or simultaneous with the crowning of the sheet A I bend the edge portion 10 to offset or joggle it slightly, in fact, to joggle it an amount equal to the thickness of the sheet A so that as the sheet A is wrapped with its edges overlapping the edge portion 11 overlaps or nests with the offset edge portion 10 as clearly shown in FIG. 6 of the drawings.

Referring more specifically to the sheet B I prefer to start with a wide sheet in flat form and which may first be crowned to the desired degree. The corrugating operation or operations are then performed on the sheet to establish upstanding ridges 12, 12a and 12b lengthwise of the sheet. In forming the ridge 12, at the center of the sheet, I prefer to shape or bend the crest of the ridge so that it has a land 13 for engagement with the sheet A and a slightly depressed or indented land 14 for the reception of the inwardly bent edge portion 10 of sheet A as clearly shown in FIG. 6 of the drawings. In carrying out my invention I prefer to shape or bend two ridges 12a, one spaced at each side of the central ridge 12 and I prefer to shape each ridge 12a so that it has a flat top or land 15 for engagement with the inner side of sheet A, as shown in FIG. 6 of the drawings. In the particular form of the invention illustrated in the drawings I prefer to shape or bend marginal or edge ridges 12b parallel with the ridges 12 and 12a, which ridges 12b occur at or close to the edges of the sheet B and are preferably proportioned so that each ridge 12b has a flat top or land 16.

The lands 13, 14, 15 and 16 are joined with each other by curved valley portions 17. The marginal edges of the sheet B are provided with a slightly inturned lip portion 19. As best illustrated in FIG. 6 of the drawings the curved valley portions of the corrugated sheet B may be reinforced by beads 18. The beads 18 are continuous there being a pair of beads 18 provided at the valleys, as shown.

The ridges 12b at opposite sides of the sheet B are preferably made slightly different from one another, that is, one of them is not quite as high nor as wide as the other, to the end that they will nest together or lap one over the other to form an overlapping seam or joint as the strip B is wrapped into spiral form. This fitting or lapping of the ridges 12b is clearly illustrated in FIG. 6 of drawings. By establishing the ridges and lands substantially by bending of the metal the sheet B is mare narrower than the initial wide sheet started with. It is to be observed that I form the several ridges or corrugations in the strip B so that when the strip B is in its final form, as shown in FIG. 6 the tops or lands of the several ridges lie in a common plane and form seat or rest against which the outer or skin sheet A bears. In practice, the corrugations may be roughly or substantially formed or established in the sheet B before wrapping, or said corrugation may be so formed simultaneously with said wrapping, however, the final shaping or forming of the finished corrugation is accomplished by shaping or otherwise forming the corrugation into a mandrel or suitable form (not shown).

In accordance with the invention I may separately or independently join the sheet together, although I prefer in practice, to establish these connections in one single, continuous operation, as by a welding or any other suitable securing operation, for example, by electrical spot welding. In the case illustrated welds 20 are established joining the overlying portions of sheet A to the underlying land 16 of sheet B. Further, welds 22 may be provided, if desired, to join the overlying portion of sheet A to the underlying land 3 of sheet B. As shown, welds 23 are established joining the overlying portions of the sheet A to the underlying lands 15 of the sheet B. It is to be understood that the welds may not only vary in character or be of different types but they may vary as to extent, for instance, in the drawings I have shown lines of spot welds wherever welds occur, whereas in practice continuous welds may be employed in any number and in any desired pattern, as circumstances require. It is to be understood that other fastening or securing means, such, for example, as rivets, screw fasteners or adhesives, or the like, may be used as desired.

In accordance with my invention I contemplate, primarily, the formation of continuous strips such as strips A and B into spirally wound bodies one strip overlying the other and joined into a solid or continuous integral structure (see FIG. 2). I contemplate that such a structure may be of any desired cross section within reasonable mechanical limits, for example, it may be round in cross section or it may be elliptical as shown in FIGS. 1 and 2 of the drawings. Further, other shapes may be formed, for example air foils wherein the corners are suitably rounded. Furthermore, the tubular structure that I form may be a straight uniform tubular structure, that is, a structure uniform in size or dimensions throughout its length, or it may be contoured, or tapered as shown, and vary in size at different points along its length. Such a condition is illustrated in FIG. 1 of the drawings where I show a typical aircraft wing section which is flat in cross section and tapered lengthwise.

When a contoured or tapered body is formed I may not only crown the sheets as above described but I stretch the sheets laterally prior to incorporation in the finished structure so that they lie flat or smooth in the finished structure which they would not do if merely formed as above described and rolled into a spiralled tapered form. By laterally stretching the sheets I mean that I stretch each sheet gradually between its edges, so that it becomes suitably arcuate in shape, leaving the edge toward the small end of the tapered structure unstretched and giving the edge toward the large end of the finished structure a maximum amount of stretch. Such stretching needs to be but slight as circumstances require, and it serves to deflect each strip from a straight elongate strip to a strip slightly curved edgewise so that it has a radius of curvature. For example, a straight cone shaped body will require a graduated amount or degree of lateral curvature of the sheet as it is wrapped from one end of the body to the other.

A spirally formed tubular structure involving outer and inner sheets A and B joined edge to edge in spirally lapped engagement is illustrated in FIGS. 1 and 2 of the drawings. The sheets are in staggered or overlapping relation so that one is corrugated to form a stiffening element while the other is plain to form a finished surface. The element thus formed may be varied in a number of ways to form a useful finished article of manufacture. In accordance with the invention, and referring specifically to the FIGS. 11 and 12 of the drawings, the tubular structure is fabricated to form a ventilated aircraft element. The wing section illustrated is a flattened tapered construction adapted to be carried by and to house one or more wing spars Z. The spars Z are beams that bear the load and are rather flexible. Consequently, the upper and lower surfacings of the wing are put under varying tension and compression loadings with the result that ordinary surfacings buckle and wrinkle. The corrugations are partially flattened at 48 where the caps of the spars or other structural parts occur. A rear trailing edge 52 in the form of or including wing flaps and ailerons may be attached. The wing structure shown in FIG. 11 houses a main spar Z and is adapted to receive a separate spar Z' at the rear edge thereof.

In accordance with the second or modified form of the invention, and as illustrated in FIGS. 6 and 7 a slip joint is provided where the sheet A is wrapped with its edge portion 10 overlapping its edge portion 11. In this case, the offset edge portion 10 is slightly wider than the edge portion 11 to the end that said edge portions can move relative to each other in the plane of the sheet A. It will be apparent that provision for said movement by allowin the sheet A to be free at the center rib 12 prevents compression forces from being imposed upon the sheet A thereby preventing buckling and wrinkling when the wing and spars Z are deflected.

In addition to the foregoing I have provided means K at the slip joint for sealing between the edge portions 10 and 11 of the sheet A. The means K involves, generally bearing strips engaged between said edge portions 10 and 11. The bearing strips like the sheets A and B are continuous elements that are flat and which have the desired frictional and sealing properties. The strips may be of metal having the desired coefficient of friction and sealing characteristics, or they may be of fabric. For example, the strips may be made of "nylon," "micarta," asbestos, or any suitable material or composition may be employed. The strips may be a woven fabric or extrusion or rolled material impregnated or lubricated with a sealing material and are secured in place by cementing to the inner and outer sheets of the structure. As clearly shown in FIG. 6, the recess and land 14 is of suitable depth to accommodate the two strips leaving the exterior of the sheet A flat and smooth.

In carrying out my invention I provide a jig or fixture (not shown), in the nature of a form, upon which the tubular fabrication that I construct is made. The said jig has the necessary features of construction and holds and supports the instant structure while it is wrapped. After the structure of the present invention is wrapped it is removed from said jig and is joined together permanently by the securing means and methods above referred to. It will be apparent that I have provided an extremely simple and practical body of fuselage construction composed of but two simple elongate strips of metal or the like. The structure of said invention may be made rigid or may be made flexible as circumstances require and which may be designed and proportioned so as to be very light, strong and durable. The structure that I provide is adapted to be supplemented by various structural members for example stringers, stiffeners, floor sections, beams, bore-sections, and bulkheads.

Referring particularly to the usefulness of the present invention in connection with the construction of aircraft, the corrugated construction that I provide is adapted to duct the flow of fluids used to improved operation of said aircraft. For example, the fluids may be handled to be used in "boundary-layer control," or "circulation control," or "anti-icing control," or "structural temperature control," etc. In all of the above mentioned "controls" it is necessary to direct the flow of air or other fluid, and to distribute it over wide areas of the body construction of the craft. In "boundary-layer control" the air is handled so that it issues from a multiplicity of ports in the outer surface of the craft's body. In "circulation control" the air is handled so that it issues as a sheet of air over the trailing portion of the aircraft wing. In "anti-icing control" the fluid is handled so that it is circulated at critical structural points to radiate heat which is absorbed from the fluid. In "structural temperature control," which is analogous to "anti-icing control," the fluid is handled so that it affects the temperature of the structural elements involved.

In FIGS. 3, 10, 11 and 12 of the drawings I have shown the application of my body construction to an aircraft employing "circulation control." In FIG. 10 I have shown an aircraft 100 having a jet type propulsion unit 101 that normally delivers a stream of fluid from a nozzle 102. One or more intake ducts 103 are provided to receive ram air as the aircraft moves forwardly and direct said ram air to the intake of the propulsion unit 101. The unit 101 is usually provided with a diffuser manifold 104 at the rear of the compressor section thereof and there is provided one or more pressure bleeds 105 adapted to receive a substantial portion of compressed air from the unit. The bleeds 105 are under control of suitable valves 106. Additional ram air intake ducts 107 are provided at the ducts 103, preferably within said ducts, as shown, and are adapted to receive a substantial portion of ram air. The ram air ducts 107 are under control of suitable valves 108.

In the application of the invention under consideration the bleed 105 and duct 107 are employed to direct the flow of air, under suitable pressure, to a duct 109 that extends longitudinally of the wing 110. In accordance with the invention, the duct 109 is established by appropriate location of the wing spar 111, which, together with the body structure that I provide, forms said duct (see FIG. 11). Since air delivered by the bleed 105 will be under greater pressure than the air delivered by duct 107, there is provided a jet at 112 which acts to induce the flow of air from the duct 107. It will be apparent how the flow of air can be controlled by regulating the valves 106 and 108, as circumstances require, so that the desired volume and pressure of air is introduced into the duct 109. Also, it will be apparent that the desired temperature of air can be determined by the regulation of the two valves.

In accordance with the present invention, the corrugations in the inner sheet of the body construction forms ducts 120 that extend transversely of the longitudinal axis of the wing 110. The corrugations forming the said ducts are flattened at 121 and 122 to receive the lower spar caps, while the corrugations are but partially flattened at 123 and 124 to receive the upper spar caps. The corrugations are completely flattened at 121, however, they may be but partially flattened at 122, as shown. Therefore, and it will be apparent, the ducts 120 are uninterrupted from a point just ahead of the forwardmost spar to a point aft of the rearmost spar.

In practice, the upper part of the wing construction can be cut off along a line 125 to the end that the ducts 120 open to discharge rearwardly along said line.

A port 126 (see FIG. 12) is provided in each corrugation, preferably just ahead of the front spar 111 so that air enters the ducts 120 from the duct 109. It will be apparent that air flows forwardly and then rearwardly in the case illustrated, and acts as an "anti-icing" means, and as well it issues from the ducts at line 125 to form a sheet of controlling air that flows over the trailing element, or portion, or flap, of the wing.

In FIGS. 8 and 11 of the drawings I have illustrated a valve means 130 for controlling the flow of air into the ports 126. As shown, the means 130 is in the form of a slide valve 131 shiftably carried in a channel member or guide 132. The slide valve 131 has a plurality of spaced openings 133 adapted to simultaneously register with the ports 126 in the plurality of corrugations. The guide 132, also, has spaced openings 134 that register with the ports and with the openings in the slide valve so that shifting of the slide valve causes opening and closing of the openings 134. The degree of shifting of the slide valve 131 determines the volume of air that enters that ducts 120.

In FIG. 9 of the drawings I have illustrated a nozzle means 135 that controls the direction and restriction of air flow from the ducts 120. The nozzle means 135 normally restricts the flow of air to some degree and is a structure that is secured to the wing 110 along the line 125. The means 135 receives air from the plurality of ducts 120 and involves upper and lower plates 136 and 137 that are movable to cause variation in the nozzle effect of said means. There is a base element 138 secured to the wing along the line 125 the forward edges of the plates 136 and 137 being pivotally secured to the base 138 as by pivot pins 139 and 140. The plates 136 and 137 are under control of suitable levers 141 and 142 and the rear edges of the plates are free. Movement of the plates relative to each other causes variations in restriction of air flow, while movement in unison causes change in direction of the nozzle opening formed by the two plates. The nozzle formed by the two plates 136 and 137 directs a flat sheet of air over the trailing element, or portion, of the wing 110.

In FIG. 3 I have shown a form of aircraft construction wherein the propulsion unit 101 is carried on a strut of pylon 150 that depends from the underside of the wing 110. It will be apparent how the ducting 103, 105 and 107 are easily adapted to direct the flow of air upwardly through the pylon 150 and into the duct 109 that extends longitudinally of the wing. The wing 110 may incorporate the features above described in connection with the wing 110, as clearly indicated in FIG. 3.

From the foregoing it will be apparent that the corrugated reinforced monocoque elements of the present invention are adapted to manifold and distribute fluid so that it is discharged in a thin sheet at the surface of the aircraft, and all without protuberances and without added structure. Thus, boundary layer separation is minimized and slower flight permitted for both takeoffs and landings, and without the danger of stalls for loss of lift. As shown in FIG. 3, discharge at and over the aileron or flap surface is inherent with the ventilated element that I provide.

In FIG. 12 I have been shown boundary layer discharge slots or rearwardly opening louvers S and S' opening at the surface of the wing 110. The placement of the slots S and S' can vary widely as circumstances require and in the drawing I have shown a typical arrangement wherein the slots are arranged in rows, preferably two separate rows. In order to most effectively discharge air in a position preceding the trailing edge control element of the wing the rows of slots S and S' are positioned ahead of said control element and rearward of the major cross-sectional dimension of the wing.

Having described only the typical preferred forms of my invention, I do not wish to be limited or restricted to the specific details herein set forth, but wish to reserve to myself any variations or modifications that may appear to those skilled in the art and fall within the scope of the following claims.

Having described my invention, I claim:

1. A spirally wrapped elongate tubular body including, a reinforcing inner sheet with its edge portions in lapped engagement and with marginal ribs at said edge positions and a rib intermediate said edge portions, and a flat outer sheet overlying said inner sheet to engage said ribs and with its edge portions in sliding lapped engagement at said intermediate rib and with the outermost of its overlapped edge portions fastened to said intermediate rib, the outer sheet being fastened to one of said edge portions of the inner sheet, and the two sheets being continuously wrapped and the edges thereof being offset longitudinally of the body.

2. A spirally wrapped elongate tubular body including, an elongate inner sheet wrapped with its edge portions in lapped engagement, a central rib extending longitudinally of said inner sheet and intermediate ribs between said central rib and the edges of the sheet, said ribs having a continuous land thereon and the central rib having a continuous recess adjacent the land, an elongate outer sheet wrapped with its edge portions in lapped engagement, one of said edge portions of the outer sheet being offset and carried in the said recess and the other said edge portion being carried in the offset portion thereof, means fastening together only the other edge portion of the outer sheet and the central rib of the inner sheet, the one edge portion of the outer sheet being in slideable and lapped engagement with said recessed portion, and means fastening together the lapped portions of the inner sheet.

3. A spirally wrapped elongate tubular body including, an elongate inner sheet wrapped with its edge portions in lapped engagement, a central rib extending longitudinally of said inner sheet and intermediate ribs between said central rib and the edges of the sheet, said ribs having a continuous land thereon and the central rib having a continuous recess adjacent the land, an elongate outer sheet wrapped with its edge portions in lapped engagement, one of said edge portions of the outer sheet being offset and carried in the said recess and the other said edge portion being carried in the offset portion, means fastening only the other edge portion of the outer sheet and the central rib of the inner sheet, the one edge portion of the outer sheet being in slideable and lapped engagement with the said recessed portion, means fastening the lands of the intermediate ribs to the inner side of the outer sheet, and means fastening together the lapped portions of the inner sheet.

4. An aircraft having a ventilated wing element and a movable flap-like control surface element comprising the trailing edge of the wing, and said wing element including, a corrugated reinforcing inner sheet, a flat outer sheet overlying said corrugated sheet forming ducts therebetween, said ducts being disposed in a direction substantially coincidental with the line of flight, ports in the corrugations to direct flow through said ducts, the said ducts being open at the top of the wing element to discharge over the control surface element, and means supplying fluid to the ports.

5. An aircraft having a ventilated wing element and a movable flap-like control surface element comprising the trailing edge of the wing, and said wing element including, a corrugated reinforcing inner sheet, a flat outer sheet overlying said corrugated sheet forming ducts therebetween, said ducts being disposed in a direction substantially coincidental with the line of flight, ports in the corrugations to direct flow through said ducts, the said ducts being open at the top of the wing element to discharge over the control surface element, and means supplying fluid to the ports and having valve means controlling the flow of fluid into the ducts.

6. An aircraft having a ventilated wing element and a movable flap-like control surface element comprising the trailing edge of the wing, and said wing element including, a reinforcing inner sheet with corrugations extending transverse of the element substantially in the line of flight, a flat outer sheet overlying said corrugated sheet forming ducts therebetween, means supplying the interior of the wing element with fluid under pressure, inlet ports in the corrugations admitting fluid to flow into said ducts from the interior of the wing element, and outlet ports in the corrugations at the top of the wing element exhausting fluid over the control surface element.

7. An aircraft having a ventilated wing element and a movable flap-like control surface element comprising the trailing edge of the wing, and said wing element including, a reinforcing inner sheet with corrugations extending transverse of the element substantially in the line of flight, a flat outer sheet overlying said corrugated sheet forming ducts therebetween, means supplying the interior of the wing element with fluid under pressure, inlet ports in the corrugations admitting fluid to flow into said ducts from the interior of the wing element, and a variable orifice nozzle at the top of the wing element exhausting said fluid over the control surface element.

8. An aircraft having a ventilated wing element and a movable flap-like control surface element comprising the trailing edge of the wing, and said wing element including a reinforcing inner sheet with corrugations extending trasverse of the element substantially in the line of flight, a flat outer sheet overlying said corrugated sheet forming ducts therebetween, means supplying the interior of the wing element with fluid under pressure, inlet ports in the corrugations admitting fluid to flow through said ducts from the interior of the wing element, a valve means controlling flow of fluid through said ducts from the interior of the element, and a variable orifice nozzle at the top of the wing element exhausting said fluid over the control surface element.

References Cited by the Examiner

UNITED STATES PATENTS

| | | | |
|---|---|---|---|
| 1,821,776 | 9/1931 | Vining | 244—134 |
| 2,437,318 | 3/1948 | Field | 244—134 |
| 2,470,128 | 5/1949 | Barrick et al. | 244—134 |
| 2,514,105 | 7/1950 | Thomas | 244—134 |
| 2,556,736 | 6/1951 | Palmatier | 244—13 |
| 2,563,054 | 8/1951 | Messinger et al. | 244—134 |
| 2,638,170 | 5/1953 | Prewitt | 244—134 |
| 2,645,435 | 7/1953 | Pouit | 244—134 |
| 3,023,860 | 3/1962 | Ellzey. | |

FERGUS S. MIDDLETON, *Primary Examiner.*

JACOB L. NACKENOFF, MILTON BUCHLER,
*Examiners.*